US005996841A

United States Patent [19]

Marrocco

[11] Patent Number: 5,996,841

[45] Date of Patent: Dec. 7, 1999

[54] MODULAR FRONT LOADING ROTARY COIN VENDING MACHINE

[75] Inventor: James A. Marrocco, Los Ossos, Calif.

[73] Assignee: Cutting Edge Industries, Inc., San Jose, Calif.

[21] Appl. No.: 08/823,477

[22] Filed: Mar. 25, 1997

[51] Int. Cl.[6] .......... B65G 59/06

[52] U.S. Cl. .......... 221/268; 221/20; 221/130; 221/232; 221/284

[58] Field of Search .......... 221/272, 274, 221/276, 273, 232, 14, 18, 268, 20, 241, 304, 282, 284, 130, 131

[56] References Cited

U.S. PATENT DOCUMENTS

| | | | |
|---|---|---|---|
| 378,982 | 3/1888 | Sielaff . | |
| 545,436 | 9/1895 | Abelson et al. | 194/255 |
| 620,527 | 2/1899 | Wright | 221/276 |
| 831,189 | 9/1906 | Rowse . | |
| 1,321,506 | 11/1919 | Bradshaw et al. . | |
| 1,410,635 | 3/1922 | Williams . | |
| 1,565,213 | 12/1925 | Simpkins | 221/152 |
| 1,611,742 | 12/1926 | Hammer | 221/276 |
| 1,652,540 | 12/1927 | Morin . | |
| 1,665,989 | 4/1928 | Smith | 221/151 |
| 1,673,030 | 6/1928 | Weiss | 194/255 |
| 1,724,297 | 8/1929 | MacGregor | 221/151 |
| 1,783,479 | 12/1930 | Nagle | 221/232 |
| 2,007,035 | 7/1935 | Carruthers | 221/232 |
| 2,101,420 | 12/1937 | Scofield | 221/273 |
| 2,218,657 | 10/1940 | Richardson et al. | 221/232 |
| 2,220,175 | 11/1940 | Rice | 221/130 |
| 2,332,317 | 10/1943 | Holcomb, Jr. | 194/225 |
| 2,400,104 | 5/1946 | Compton et al. | 221/268 |
| 2,444,747 | 7/1948 | Niewoehner | 221/232 |
| 2,522,033 | 9/1950 | Graham | 221/232 |
| 2,673,133 | 3/1954 | Koch | 221/152 |
| 2,696,324 | 12/1954 | Jones | 221/273 |
| 3,276,457 | 10/1966 | Edds | 221/276 |
| 3,298,570 | 1/1967 | Skorey et al. | 221/272 |

(List continued on next page.)

FOREIGN PATENT DOCUMENTS

| | | | |
|---|---|---|---|
| 2715109 | 10/1978 | Germany | 221/268 |
| 2740015 | 3/1979 | Germany | 221/268 |
| 2-159696 | 6/1990 | Japan | 221/268 |
| 6-44453 | 2/1994 | Japan | 221/268 |

*Primary Examiner*—Robert P. Olszewski
*Assistant Examiner*—Thuy V. Tran
*Attorney, Agent, or Firm*—Donald E. Schreiber

[57] ABSTRACT

A modular, front loading coin operated vending machine with a rotary coin mechanism operating a reciprocating dispensing mechanism dispenses different sizes and quantities of flat merchandise. A back lever arm on the rotary coin mechanism turns with the front coin turning knob and pulls a flexible cable through a grommetted hole in a vertical wall to draw a push plate forward in a chassis slide opening to force a measured size or quantity of the flat merchandise out through a dispensing slot. Shims between the push plate and the sliding plate raise it to vary the size and quantity of merchandise contacted by the push plate. Full width open front merchandise chutes are interchangeably installed A merchandise weight with a bottom protrusion holds down the merchandise. When the merchandise chute is empty the bottom protrusion of the merchandise weight falls into the slide opening to block the push plate from moving forward and preventing the turning of the coin knob. The dispensing slot has a front angled slot guard and a back adjustable soft rubber wiper. A modular cabinet with top and bottom mating connecting openings houses the vending machine components and has a front cabinet opening which enables full access for servicing the components. An entire front panel of the cabinet is normally locked over the front cabinet opening and swings open on a bottom hinge attached to the cabinet to rest in a horizontal position supported by cables from the cabinet to act as a work surface during servicing. A display window in the panel has a back plate pivotally attached to the back of the front panel by a stud-in-notch hinge pivot for changing displays.

10 Claims, 3 Drawing Sheets

U.S. PATENT DOCUMENTS

| | | | |
|---|---|---|---|
| 3,442,200 | 5/1969 | Babel | 221/150 |
| 3,442,422 | 5/1969 | Neidig | 221/268 |
| 4,168,784 | 9/1979 | Heier | 221/125 |
| 4,363,393 | 12/1982 | McDonald | 194/63 |
| 4,702,392 | 10/1987 | Rachman | 221/151 |
| 5,197,589 | 3/1993 | Gordon | 194/248 |

MODULAR FRONT LOADING ROTARY COIN VENDING MACHINE

BACKGROUND OF THE INVENTION

1. Field of the Invention

The present invention relates to vending machines and in particular to a modular front loading vending machine with a rotary coin mechanism for dispensing different sizes and quantities of merchandise.

2. Description of the Prior Art

Vending machines provide a convenient way to sell merchandise at a variety of locations without the need for a salesperson to be present at the transaction. Customers select the merchandise, input the necessary amount of money and receive the merchandise dispensed from the machine. Periodically the vending machines are refilled with merchandise and the money emptied by the owners of the machines.

Because of the often remote and normally unattended location of the vending machines, vandalism and theft are problems. People attempt to remove merchandise from the vending machines without inputting money, remove more merchandise than they have paid for, steal money, or just damage the machine. Sharp objects are often inserted in the dispensing slot to access the merchandise or around the edges of the vending machine doors or opening panels in an attempt to open them. Often coin mechanisms are damaged.

Many prior art vending machines are difficult to service and require moving the machines for access to restock merchandise or remove the money. In remote locations service people have no table or counter on which to set merchandise, tools, or money while working on the machines, but very often use the ground or floor for a work surface. Often vending machines provide dispensers for a single size of merchandise and a single quantity of the merchandise dispensed. Structural changes would be required to prepare some of the prior art vending machines to dispense different sizes of merchandise.

Many vending machines, especially those dispensing flat merchandise, have a pull type reciprocating dispensing mechanism which may cause the machine to tip over onto the user if the pull mechanism is yanked out too aggressively.

Many of the working components of prior art vending machines are built into the cabinets or secured with fasteners requiring tools to change the components.

U.S. Pat. No. 4,168,784 which issued Sep. 25, 1979, to William Heier ("the Heier patent") discloses a flat product vending machine with one or more reciprocating coin slides and a plurality of reciprocating product dispensing levers independent of the coin slide. The Heier patent operates, after insertion of a coin or coins and pushing the coin slide, by one product dispensing, lever pulling a vend plate assembly forward to push aside an array of disks in a transverse channel which block any other vend plate from moving forward, while the vend plate forces a flat product out of a vend slot. The vend plate assembly remains to block any further vending until the coin slide is pushed in again forcing the vend plate assembly back to prepare for vending. The Heier patent operating mechanisms are overly complex requiring a two-step operation to vend with a danger of tipping the vending machine when pulling the vend lever.

U.S. Pat. No. 4,702,392 which issued Oct. 27, 1987, to Isadore B. Rachman ("the Rachman patent") discloses a flat package vending machine with a rotary coin mechanism having a rotating cam which engages an activator rod which pushes an activator rod back to release a vend plate assembly as described in the Heier patent. The Rachman patent also requires pulling a vend lever to activate the Heier patent type vend plate assembly. As in the Heier patent, the Rachman patent has a relatively complex mechanism to push back on all of the vend plate assemblies to disengage the one in the blocking position to enable one of the vend levers to be pulled.

U.S. Pat. No. 4,363,393 which issued Dec. 14, 1982, to Winford G. McDonald ("the McDonald patent") discloses a rotary coin mechanism which uses a continually rotating operating knob as is used in the present invention. However, the McDonald patent uses a mechanically complicated cam and lever system to push the merchandise for it to fall out of a dispensing chute.

SUMMARY OF THE INVENTION

The present invention provides a modular front loading vending machine with a rotary coin mechanism and security, variable merchandise, and ease of servicing features.

An object of the present invention is to provide a vending machine having a full-length hinged entire front panel which swings open for easy servicing access to all of the internal components with no need to move the machine.

Another object is to provide a venting machine having a theft resistant front panel which includes a security joint that prevents insertion of blade type objects into the machine.

An additional object is to provide a vending machine having a hinged front panel with a flat back and a retainer so that the panel rests in a horizontal open position to serve as a work surface during loading and servicing.

A further object is to provide a vending machine having a large display window on the front panel with a pivotable back plate to provide easy access for display changes.

A contributory object is to provide a vending machine having full width merchandise chutes with open fronts to allow merchandise to be loaded directly from the front without tipping the merchandise or sliding it in from the top.

An added object of the present invention is to provide a vending machine having delivery slot guards partially covering delivery slots to prevent line-of-sight to and tampering with the merchandise and the mechanism inside the vending machine through the delivery slots.

An ensuing object is to provide a vending machine having a drawer-type coin box which slides forward out of the front of the open vending machine cabinet onto the back surface of the open panel for ease of emptying.

An ancillary object is to provide a vending machine cabinet with a modular shape and compatible mounting holes in the top and bottom of the vending machine cabinet to fit existing related vending machine stands and to enable stacking and nesting of the vending machine with compatible vending machine cabinets for increasing or decreasing the point of sale configurations as needed.

An accessory object is to provide the vending machine cabinet with a thick bottom to make it more rigid to withstand handling, vandalism, and theft attempts.

Yet another object is to provide the vending machine with a rotary coin mechanism which connects with a reciprocating slide delivery mechanism using a lever arm and flexible pull cable linkage to lower the parts and manufacturing costs, to take up less machine space than reciprocating coin mechanisms, to create a safer mechanism for children in that they are less likely to pull the machine over onto themselves as they do with straight lever pull mechanisms, and to eliminate free vends.

An auxiliary object is to provide a vending machine having a quick change coin mechanism mount with no screws to remove the mount holding the coin mechanisms thereby permitting front access, easy service, and quickly changing a malfunctioning coin mechanism Another corollary object is to provide a vending machine having a low-friction pull cable linkage hole in a panel between the rotary coin mechanism and the reciprocating slide delivery mechanism for ease of operation, to reduce wear on the pull cable passing therethrough, and to extend the life of the pull cable.

An associated object is to provide a vending machine having an adjustable height slide delivery mechanism to permit vending cards or other flat merchandise of differing thicknesses and differing quantities.

A subsequent object is to provide a vending machine that facilitates changing the slide delivery mechanism for vending cards or other flat merchandise of differing thicknesses and differing quantities.

Still another object is to provide a vending machine having full width merchandise chutes that are readily changed so that different sizes of merchandise can be easily accommodated by changing the chutes.

A successive object is to provide a vending machine that is easily adjusted to allow various quantities or various sizes of cards or flat merchandise to pass through the adjustable height slot opening.

A successive object is to provide a vending machine having an adjustable size slot opening that minimizing scratching of glossy merchandise.

A different object is to provide a vending machine having a merchandise weight conforming in size to the height and width of the merchandise that bears down on the merchandise to ensure merchandise engagement with the delivery mechanism, and having a bottom notched protrusion so that when the merchandise chute is empty the bottom notched protrusion blocks operation of the merchandise delivery mechanism and of coin acceptance.

A next object is to provide a vending machine adapted for securing merchandise weights to prevent damaging the vending machine during shipment.

Briefly, the present invention is a modular, front loading vending machine with a rotary coin mechanism for dispensing different sizes and quantities of flat merchandise, such as collectable cards, stickers, and the like.

The rotary coin mechanism has a pivot arm that pulls a flexible pull cable through an adjacent vertical wall opening having a low friction grommet and draws forward a reciprocating slide delivery mechanism to force the merchandise out through a front dispensing slot. A spring attached to the rear of the chassis in the vending machine and the back of the slide delivery mechanism pulls it back after delivery returning the merchandise delivery mechanism to a pre-dispensing position. A spring loaded lever arm in the coin mechanism detects the presence of coins to permit rotation, or the absence of coins to block rotation. Two rotary coin mechanisms are mounted side by side on a removable vertical support held in place by the front panel.

The slide delivery mechanism rides in a horizontal front to back chassis channel or slot through a slide space, and may be adjusted higher or lower by adding or deleting shims to accommodate different thicknesses and quantities of merchandise. A merchandise weight on top of the supply of merchandise stops the slide delivery mechanism from advancing when there is no more merchandise, thereby preventing rotation of the coin mechanism and allowing the coins to be removed.

An adjustable soft wiper on the inside of the delivery slot controls the slot opening. A metal delivery slot guard on the outside of the vending machine cabinet obscures the slot to block access to the merchandise.

The vending machine cabinet is modular in shape with top and bottom compatible mounting openings for attaching to a stand and stacking and nesting with other compatible vending machine cabinets. The bottom of the cabinet is extra thick for structural integrity.

The whole entire front panel pivots open on a bottom hinge for front loading access to all of the serviceable parts of the vending machine. Tabs on all sides of the front panel insert in mating slots on the front edges of the cabinet to prevent sharp objects being inserted between the overlapping front panel and cabinet. When open, the front panel is supported in a horizontal position by a retainer from the cabinet so that the flat back face of the panel serves as a work surface to load and service the vending machine. A display window in the panel is backed by a pivotable back plate using a stud-in-notch hinge pivot to create easy access for display changes.

Open front full width merchandise chutes are installed with chute tabs inserted in chassis slots and the chute top secured by a top cabinet bolt and hand-operated knob. A removal front plate normally covers the merchandise, but lifts out to allow front loading of the merchandise in the chutes, which may be easily changed to accommodate merchandise of different sizes.

Coins from the rotary coin mechanism fall into a coin tray which slides forward onto the open front panel for emptying the coins.

An advantage of the flat merchandise vending machine of the present invention is that it saves space with the combined rotary coin mechanism and reciprocating slide delivery mechanism, and is also safer to use than pull dispensing mechanisms.

Another advantage of the flat merchandise vending machine of the present invention is that the modular interconnecting chassis may be attached to existing stands and nested and stacked together for convenient merchandising.

A third advantage of the flat merchandise vending machine of the present invention is that the bottom hinged front panel swings down to a horizontal work surface and permits full access to all of the parts of the vending machine requiring servicing or replacement with all parts easily removed and installed.

A further advantage of the flat merchandise vending machine of the present invention is that the front loading chassis with compatible top and bottom mounting openings permits stacking of the vending machines to allow a number of the machines to be operating in a limited space.

An additional advantage of the flat merchandise vending machine of the present invention is that it is configured for ease of manufacturing and servicing while providing numerous safety features to prevent theft and vandalism.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figures 1, 2:
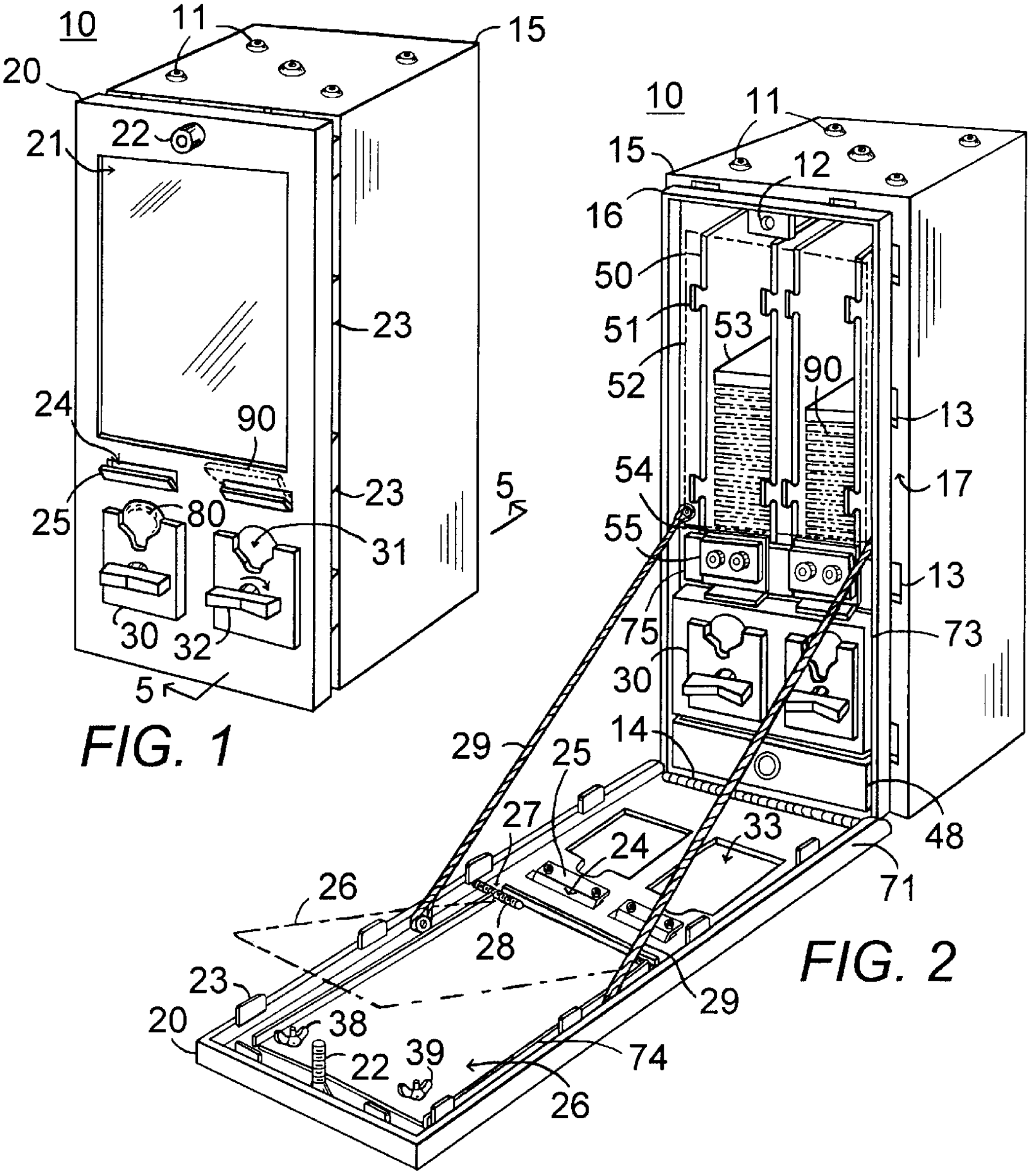
FIG. 1 is a perspective view of the modular front loading rotary coin vending machine in accordance with the present invention.
FIG. 2 is a perspective view of the vending machine invention with the entire front panel open revealing the components inside the cabinet and access thereto and showing the front panel in a horizontal position acting as a work surface for servicing the vending machine.

In FIGS. 1 and 2 a vending machine 10 for storing a quantity of flat merchandise 90, receiving coins 80, and dispensing a measured quantity of the flat merchandise 90, comprises a cabinet 15, a full-length opening front panel 20, coin receiving mechanisms 30, and slots 24 for dispensing the flat merchandise 90 indicated by a dashed line in FIG. 1.

The cabinet 15 is formed of a rigid tamper-proof construction for housing the vending machine components, which cabinet is provided with an interior chassis 18 and 19 (shown in FIGS. 3 and 5) permanently secured to the interior of the cabinet by securing means for receiving the vending machine components. A front cabinet opening through which the components may be accessed for servicing has a front edge 17 around the front opening and a protruding peripheral flange 16 recessed from the outside of the cabinet 15.

Figure 9:
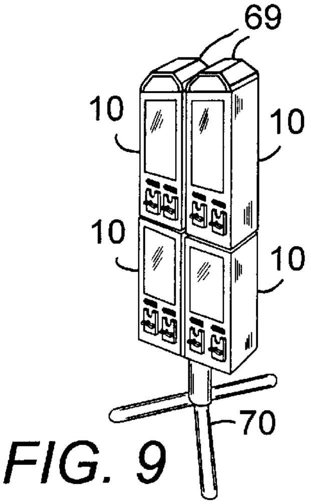
FIG. 9 is a perspective view of four of the modular front loading rotary coin vending machines nested together and mounted on a stand with additional top caps.

The cabinet 15 further comprises a top and a bottom surface (shown in FIG. 5) and the cabinet is structured in a modular shape with compatible mounting openings 11 on the top and bottom surfaces, so that a number of cabinets may be stacked and secured together (as illustrated in FIG. 9). The cabinet 15 may be secured to an external stand 70 having compatible mounting openings with a securing means interconnected between the mounting openings, such as bolts or screws. Additional top caps 69 may be similarly mounted on top of the top vending machines in the stacked array for decoration, advertising, or other purposes.

The entire front panel 20 of the cabinet is pivotally attached to the cabinet by a hinge 14 at a bottom edge of the front panel. The front panel 20 is positioned alternately between a closed vertical position locked to the cabinet to cover the front cabinet opening, as in FIG. 1, and an open horizontal position held open by a holding means, such as cables 29, or by a pair of hinged bars, from the cabinet to serve as a horizontal work surface for servicing the vending machine, as in FIG. 2. The front panel 20 is provided with two openings 33 to receive the coin receiving mechanisms 30, and with two dispensing slots 24 to receive the flat merchandise 90 (shown dashed) dispensed therethrough with the front panel in the closed position as in FIG. 1. The vending machine of the present invention could have a single coin receiving mechanism and a single merchandise dispensing mechanism or more than two of each as desired by making the cabinet in different widths.

A delivery slot guard 25 is formed by an angled metal tab attached to the back surface of the front panel adjacent to each dispensing slot 24 and the metal tab protrudes out of the dispensing slot at an angle partially blocking the dispensing slot to block access to the merchandise inside the vending machine.

The front edge 17 of the cabinet 15 is provided with a series of slots 13 therethrough. The front panel 20 further comprises a peripheral edge 71 mating with the front edge of the cabinet and overlapping the peripheral flange 16. The peripheral edge 71 is provided with a series of tabs 23 protruding therefrom that mate with and penetrate the series of slots 13 to engage the series of slots 13 in the closed position of the front panel 20 thereby creating a security joint.

The front panel 20 has substantially flat front and back faces and is provided with an opening therethrough and is further provided with a transparent display window 21. The display window 21 covers the opening with the display window set over the back face and held in place by a rigid plate 26. The rigid plate 26 is pivotally attached to the back face at one end with stud-in-groove pivots comprised of studs 28 protruding from the peripheral edge 71 of the front panel fitting within notches 27 located at a lower end of a protruding edge 74 of the rigid plate 26. The plate 26 is secured at the other end with studs 38 and wing nuts 39. Thus, the rigid plate 26 may be pivoted open (shown with dashed lines) to change a display visible through the display window 21 on the front face of the front panel 20. In addition, the metal plate 26 prevents breaking through the display window 21 to reach the merchandise inside.

Figure 5:
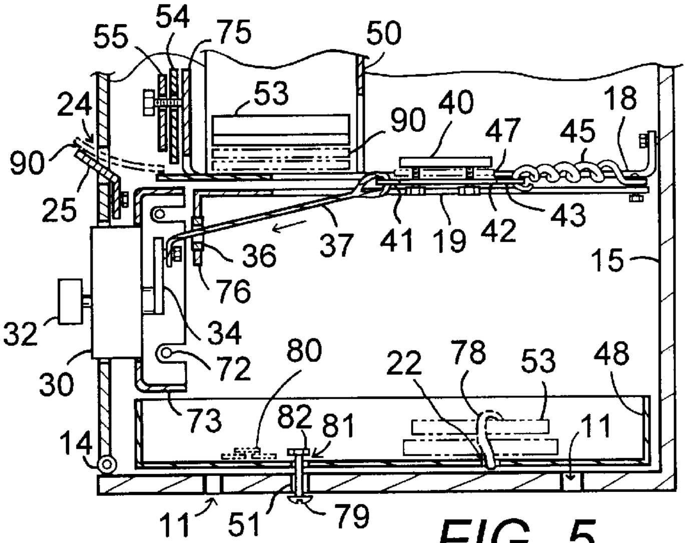
FIG. 5 is a partial sectional view taken through 5—5 of FIG. 1 showing the main working components of the vending machine invention.

In FIGS. 1, 2, 3, and 5 a pair of rotary coin receiving mechanisms 30 are removably secured to the chassis 18, 19 by a plate 73 with notched flanges resting on rods 72 that protrude from the sides of the cabinet (as seen in FIG. 5). The plate 73 is held in place by the front panel 20 when closed and by a pull cable 37 linking means, connected between each coin receiving mechanisms 30 and each merchandise dispensing slide mechanism 40/42, when the front panel 20 is open. With the front panel 20 open, the plate 73 and the coin receiving mechanisms 30 are removable and replaceable as a unit by detaching the pull cable 37 secured to a rotatable lever arm 34 of the coin receiving mechanisms 30.

Figure 3:
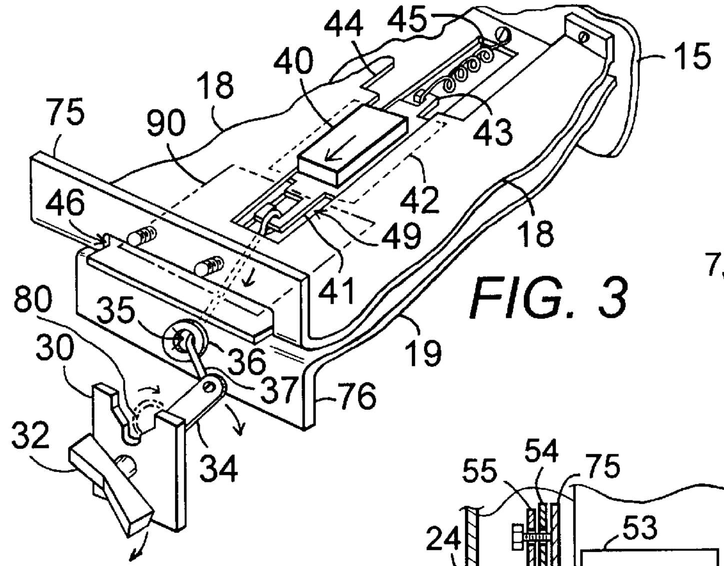
FIG. 3 is a partial perspective view showing the interacting rotary coin mechanism and reciprocating dispensing mechanism.
Figure 4:
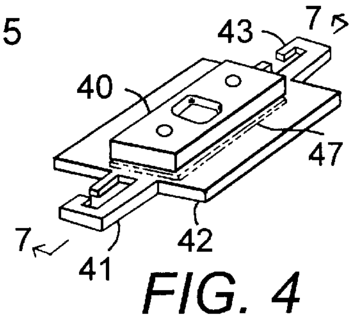
FIG. 4 is a perspective view of the interconnected push plate and slide plate with a shim sandwiched therebetween.

A coin receiving slot 31 is exposed on the outside of the cabinet and a coin releasing portion of the coin receiving mechanism 30 inside the cabinet drops the coins into a coin drawer 48 or open box resting on the bottom of the cabinet. A front rotatable operating knob 32 is exposed on the outside of the cabinet, and the rear rotatable lever arm 34 is secured to the operating knob by a cooperative securing means, such as an axle included in the coin receiving mechanism 30. Thus, the lever arm 34 rotates with the operating knob 32 when a correct number of coins have been placed in the coin receiving slot 31 and the operating knob is rotated by a user (as best seen in FIG. 3). A spring-loaded lever in the coin receiving mechanism detects the presence or absence of the correct number of coins in the coin receiving slot as the operating knob is rotated, stopping the rotation if there is not. The coin receiving mechanism is a model 3-612 or 3-632 marketed by The Northwestern Corporation of Morris, Ill., or a Beaver coin mechanism model NB1040A marketed by Machine-O-Matic Limited of New Market, Ontario, Canada.

In FIGS. 3, 4, 5, and 7 a reciprocating merchandise dispensing slide mechanism 40/42 is slidably mounted on the chassis 18, 19 by a sliding mounting means in alignment with a merchandise chute 50 and positioned rearwardly thereof. The merchandise dispensing slide mechanism 40/42 is interconnected with the rotatable lever arm 34 of the coin mechanism by a flexible linking means such as the pull cable 37. Thus, when the lever arm 34 rotates the merchandise dispensing slide mechanism 40/42 is pulled forward by the pull cable 37 into contact with the flat merchandise 90 causing a desired quantity of the flat merchandise 90 to move forward through the dispensing slot 24 within reach of the user (as best illustrated in FIGS. 3 and 5). The reciprocating dispensing mechanismn comprises a slide mechanisnm 40/42 slidably supported within the chassis 18/19 in a slide opening 49 (as best seen open in FIG. 10) that is aligned with the merchandise chute 50. A spring 45 attached between the slide mechanism 40/42 and the rear of the chassis 18/19 urges the dispensing mechanism toward a position rearwardly of the merchandise chute 50.

The slide mechanism 40/42 comprises a push plate 40 attached by studs 61 and nuts 68 to a slide plate 42 that connects to the pull cable 37 through one hook-end 41 of the slide plate. The return spring 45 connects to the other hook-end 43 of the slide plate. The sides of the slide plate fit between two horizontal chassis members 18 and 19 forming slide channels 77 that receives the slide plate 42. The slide opening 49 cut through both horizontal chassis member 18 and 19 allows the push plate 40 to pass back and forth in the slide space. A wider space 44 cut into just the top horizontal chassis member 19 near the back of the cabinet allows the slide mechanism 40/42 to be lifted out through the wider space and removed. One or more shims 47 are positionable between the push plate 40 and the slide plate 42 so that the height of the push plate is adjustable for varying the thickness and quantity of merchandise pushed by the slide mechanism 40/42 through the dispensing slot 24.

A vertical flange surface 76 of the bottom horizontal chassis surface 19 extends downwardly adjacent to the coin mechanism 30, between the coin mechanism and the slide mechanism 40/42. The vertical surface 76 is pierced by a hole 35 that is aligned with the slide mechanism 40/42, and the hole 35 is fitted with an encircling. low-friction grommet 36. The pull cable 37 passes through the hole between the lever arm 34 and the slide mechanism 40/42 so that a rotation of the lever arm 34 draws the pull cable 37 through the hole 35 and the pull cable 37 pulls the slide mechanism 40/42 forward, as indicated by the arrows in FIGS. 3 and 5. The low-friction grommet 36 allows the pull cable 37 to pass through the hole 35 freely without significant wear of the pull cable 37.

Figure 8:
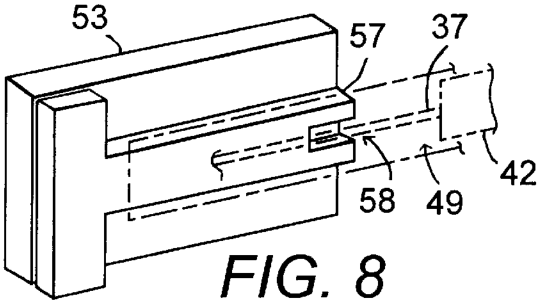
FIG. 8 is a perspective view of the bottom of the merchandise weight aligned with the slide space and slide mechanism (shown in dashed lines)

In FIGS. 2, 5, and 8, a merchandise weight 53 rests on top of the flat merchandise to keep the merchandise moving down the merchandise chute 50 as the bottom merchandise is dispensed. The merchandise weight 53 has a bottom protrusion 57 (as seen in FIG. 8) structured to tit into the slide opening( 49. When there is no more merchandise, the bottom protrusion 57 of the merchandise weight 53 falls into the slide opening 49 to block the slide mechanism 40/42, and to thereby prevent turning the coin mechanism knob 32. A notch 58 in the bottom protrusion accommodates the pull cable 37 therein so that it is not crimped.

In FIG. 5, the cash drawer 48, resting on the bottom of the cabinet positioned below the coin receiving mechanism, is provided with two holes 22 therethrough spaced apart by the width of the widest merchandise weight 53. A tie-down strap 78, looping through the holes 22, secures two merchandise weights 53 within the cash drawer 48 during shipping so that the vending machine may be transported without internal damage. The bottom of the cabinet 15 is further provided with an additional hole 51 therethrough and a mating hole 81 pierces the bottom of the cash box 48 so that a screw 79 threaded into a bushing 82 secured to the bottom of the cash box 48 secures the cash drawer during shipping.

Figure 10:
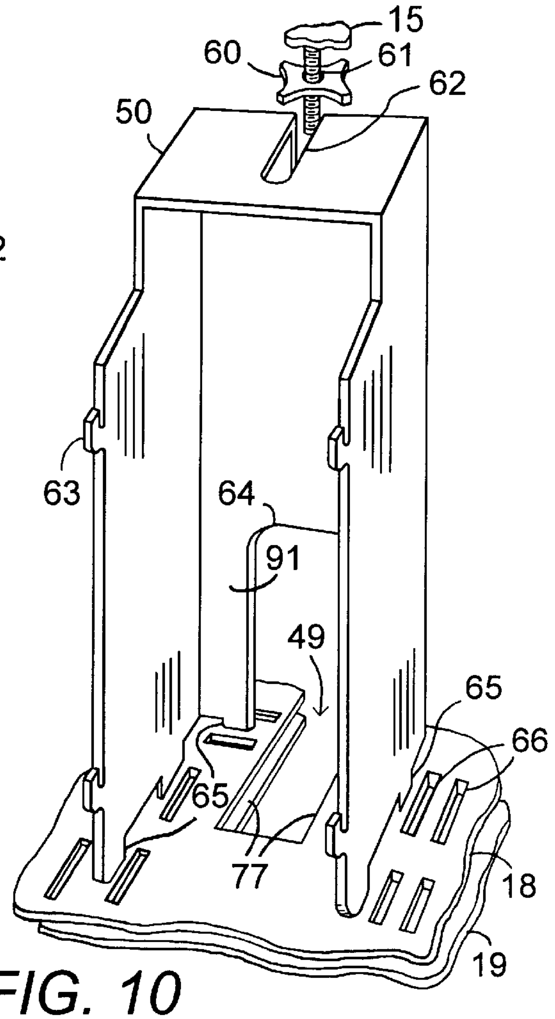
FIG. 10 is a partial perspective view showing a merchandise chute aligned for installation in the vending machine chassis.

In FIGS. 2, 5, and 10, a merchandise chute 50 has bottom tabs 65 insertable in the chassis slots 66 of the top horizontal surface 18 of the chassis. An open front portion of the merchandise chute 50, that is slightly wider than the width of the flat merchandise 90, receive a quantity of the flat merchandise loaded into the merchandise chute 50 through the front opening of the cabinet. A top slot 62 in the merchandise chute 50 extending from the top to the back of the merchandise storage chute admits a stud 61 that projects downward from the top of the cabinet 15. With the chute bottom tabs 65 inserted into the chassis slots 66, a knob 60 screws downward along the stud 61 to clamp the merchandise chute 50 in place without the need for any tools. Having a variety of chassis slots 66 in the chassis positioned with different spacing permits installing different sizes of merchandise chute 50 that receive differently sized merchandise 90.

Hooks 63 protruding from the front of the merchandise chutes 50 receive a flat vertical plate 52 (shown dashed in FIG. 2) through slots that pierce the vertical plate. The vertical plate 52, which is easily removed for restocking the merchandise, holds the flat merchandise 90 in the merchandise chute 50.

A lower back opening 64 in a rear wall 91 of the merchandise chute 50 allows clearance for the slide mechanism 40/42, and finger access to remove merchandise. The rear wall 91 and the tabs 65 adjacent to the lower back opening 64 in the chute 50 restrains merchandise 90 from sliding to the back of the cabinet when the spring 45 returns the slide mechanism 40/42 to a pre-delivery position.

Figure 6:
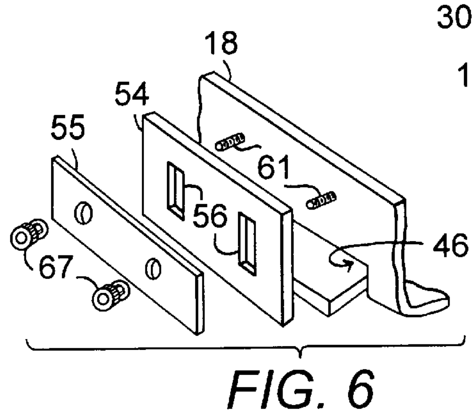
FIG. 6 is an exploded perspective view of the soft wiper blade components aligned for assembly.
Figure 7:
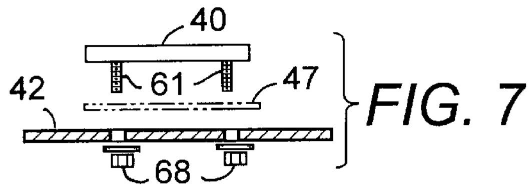
FIG. 7 is an exploded side elevational view in partial section taken through 7—7 of FIG. 4 showing the push and slide plate components aligned for assembly.

In FIGS. 2, 5, and 6, a vertical soft rubber or plastic wiper 54 is mounted by an adjustable means to a vertical extension 75 of the top horizontal chassis element 18. The wiper 54 and vertical extension 75 are located in front of the merchandise chute 50 between the merchandise chute 50 and the dispensing slot 24. Elongated slots 56 in the rubber or plastic wiper 54 enable it to slide vertically on studs 61 protruding from the vertical extension 75. Hand nuts 67 threaded onto the studs 61 secure a small metal plate 55 against the rubber or plastic wiper 54 at any desired height. Adjusting the height of the soft rubber or plastic wiper 54 controls the effective height of an inner slot opening 46, formed by a portion of the vertical extension 75 that is cut and bent forward. The effective height of the slot 46 established by the wiper 54 determines the thickness and quantity of flat merchandise 90 passing through the dispensing slot.

Most of the components are fabricated of hard steel for durability and security against theft and vandalism.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A vending machine for storing a quantity of flat merchandise, receiving coins, and dispensing a measured quantity of the flat merchandise, the vending machine comprising:

a cabinet formed of a rigid tamper-proof construction for housing vending machine components, which cabinet is provided with an interior chassis for receiving the vending machine components, and the cabinet further provided with a front cabinet opening extending from top to bottom of the cabinet through which the vending machine components may be accessed for servicing;

at least one coin receiving mechanism supported on the interior chassis for receiving at least one coin into the vending machine;

at least one merchandise chute secured to the interior chassis for receiving the quantity of flat merchandise;

at least one dispensing means for dispensing a measured quantity of the flat merchandise from the merchandise chute upon receipt of a coin into the vending machine by the coin receiving mechanism;

a one-piece front panel for closing the front cabinet opening that is pivotally attached to the cabinet by a hinging means at a bottom edge of the front panel, the front panel alternately positionable between a closed position locked to the cabinet that closes the front cabinet opening, and an open position supported from the cabinet to provide a work surface for servicing the vending machine components, the front panel having at least one opening to receive the coin receiving mechanism supported on the chassis, and at least one dispensing slot through which the flat merchandise is dispensed when the front panel is disposed in the closed position.

2. The vending machine of claim 1 wherein the front panel further comprises a dispensing slot guard attached thereto partially blocking the dispensing slot to prevent access to the merchandise inside the vending machine.

3. The vending machine of claim 1 wherein:

the cabinet further comprises a front edge around the front cabinet opening and a protruding, peripheral flange recessed from the outside of the front edge and the front edge is provided with a series of slots therethrough; and the front panel further comprises a peripheral edge mating with the front edge of the cabinet and overlapping the peripheral flange, and the peripheral edge is provided with a series of tabs protruding therefrom mating with the series of slots to engage the series of slots in the closed position of the front panel thereby creating a security joint.

4. The vending machine of claim 1 wherein the front panel further comprises a front face and a back face and is provided with an opening therethrough, the front panel being further provided with a transparent display window covering the opening with the display window set over the back face and held in place by a rigid plate pivotally attached to the back face at one end of the rigid plate with stud-in-groove pivots and secured at another end with studs and nuts, so that the rigid plate may be pivoted open to change a display visible through the display window on the front face of the front panel.

5. The vending machine of claim 1 wherein the cabinet further comprises a top and a bottom surface and the cabinet is structured in a modular shape with compatible mounting openings on the top and bottom surfaces, so that a number of cabinets may be stacked and secured together.

6. A vending machine for storing a quantity of flat merchandise, receiving coins, and dispensing a measured quantity of the flat merchandise, the vending machine comprising:

a cabinet formed of a rigid tamper-proof construction for housing vending machine components, which cabinet is provided with an interior chassis having at least one horizontal surface with chassis slots formed therein, the interior chassis being secured to the cabinet for receiving the vending machine components, and the cabinet being further provided with a solid top, back, bottom, and sides and a front cabinet opening through which the vending machine components may be accessed for servicing;

at least one coin receiving mechanism supported on the interior chassis for receiving at least one coin into the vending machine;

at least one merchandise chute having bottom tabs insertable in the chassis slots of the horizontal surface of the interior chassis, and having an open front portion of the merchandise chute slightly wider than the width of the flat merchandise for receiving a quantity of the flat merchandise therethrough, and having a top slot formed at a top of the merchandise chute;

a stud secured to the cabinet above the merchandise chute and protruding downwardly for insertion in the top slot of the merchandise chute, and a knob threaded onto the stud so that when the merchandise chute is installed in the cabinet the knob may be screwed down to secure the merchandise chute in place within the vending machine;

at least one dispensing means for dispensing a measured quantity of the flat merchandise from the merchandise chute upon receipt of a coin into the vending machine by the coin receiving mechanism;

a front panel to cover the front cabinet opening, and provided with at least one opening to receive the coin receiving mechanism and at least one dispensing slot through which the flat merchandise passes upon being dispensed from the vending machine.

7. The vending machine of claim 6 further comprising a dispensing slot guard attached to the front panel for partially blocking the dispensing slot to prevent access to the flat merchandise inside the vending machine.

8. The vending machine of claim 6 further comprising a wiper located between the merchandise dispensing chute and the dispensing means that may be adjusted to determine the thickness and quantity of flat merchandise passing through the dispensing slot.

9. The vending machine of claim 8 wherein the wiper comprises a sheet of soft material that is adjustable by slot and screw means.

10. The vending machine of claim 6 wherein the bottom of the cabinet is provided with a hole therethrough, and the vending machine further comprises a coin drawer adapted to rest on the bottom of the cabinet below the coin receiving mechanism, the coin drawer having a bottom that is provided with a hole that mates with the hole on the bottom of the cabinet, so that a screw inserted through the bottom ofthe cabinet may secure the coin drawer within the vending machine.

* * * * *